(No Model.)
W. BRIGHTMORE.
BRICK PRESS.
No. 539,247. Patented May 14, 1895.
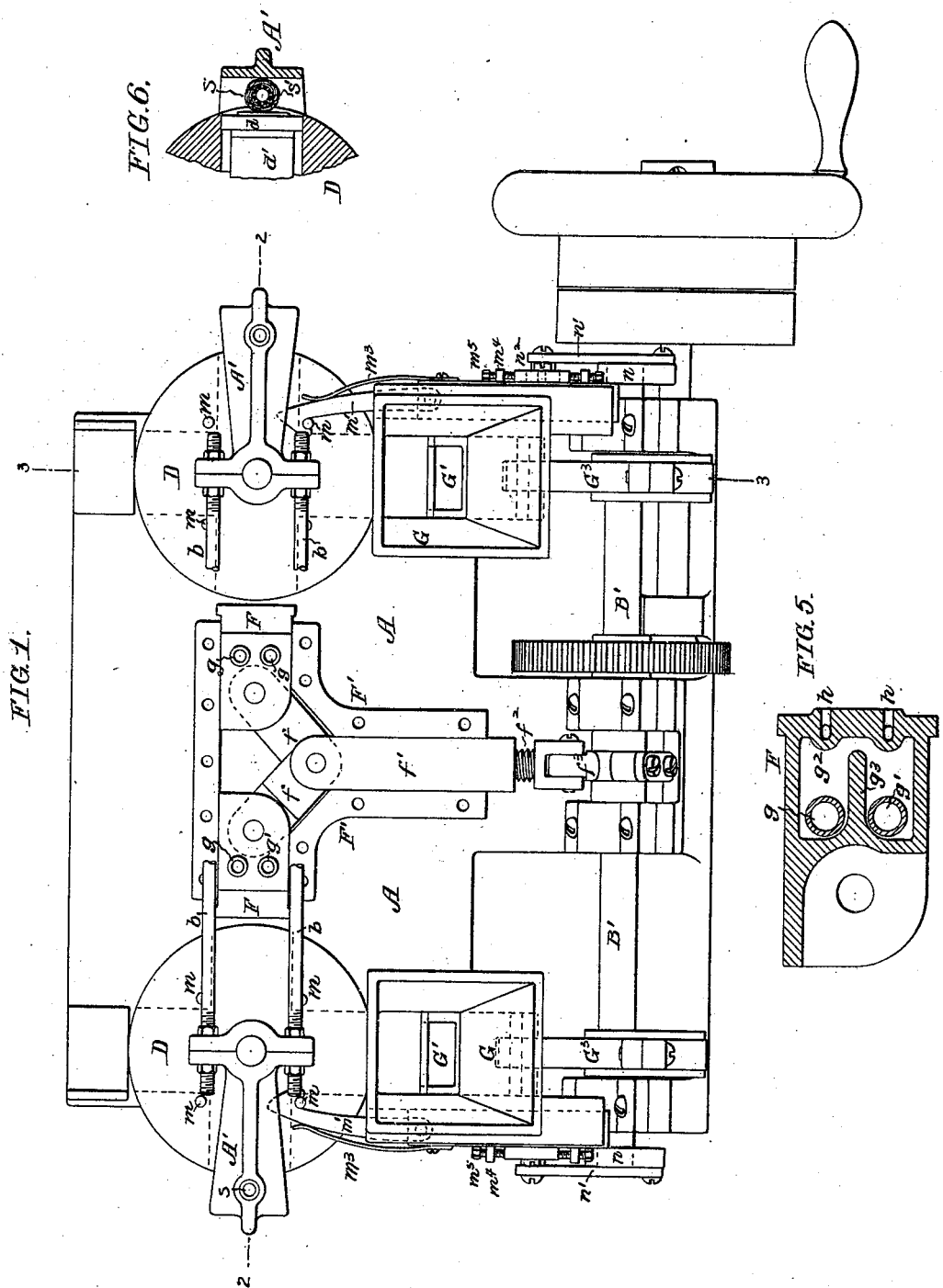
Witnesses:
F. D. Goodwin
Frank E. Bechtold
Inventor:
William Brightmore
By his Attorneys
Howson & Howson (No Model.) 2 Sheets—Sheet 2.
W. BRIGHTMORE.
BRICK PRESS.
No. 539,247. Patented May 14, 1895.
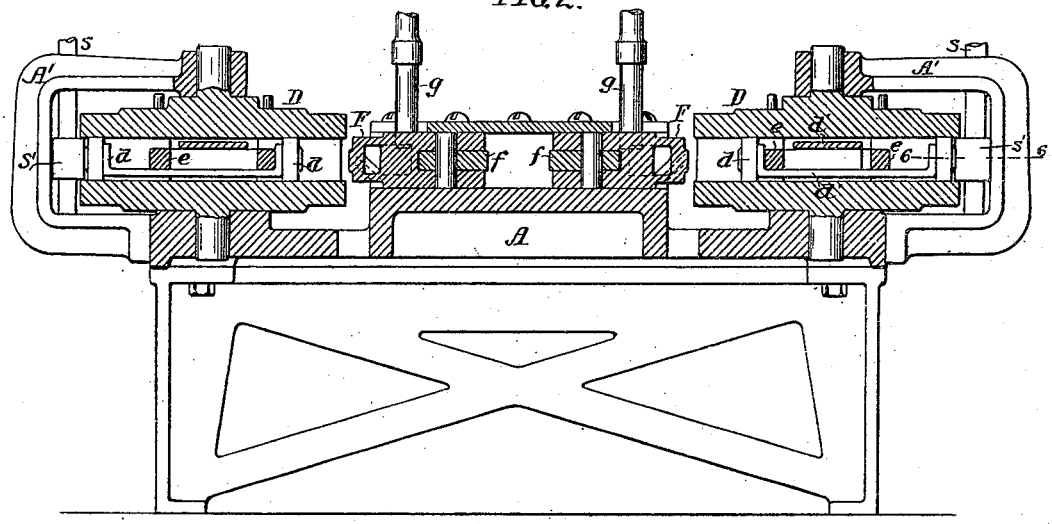
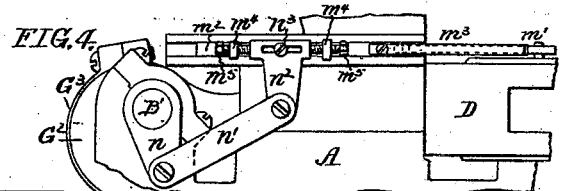
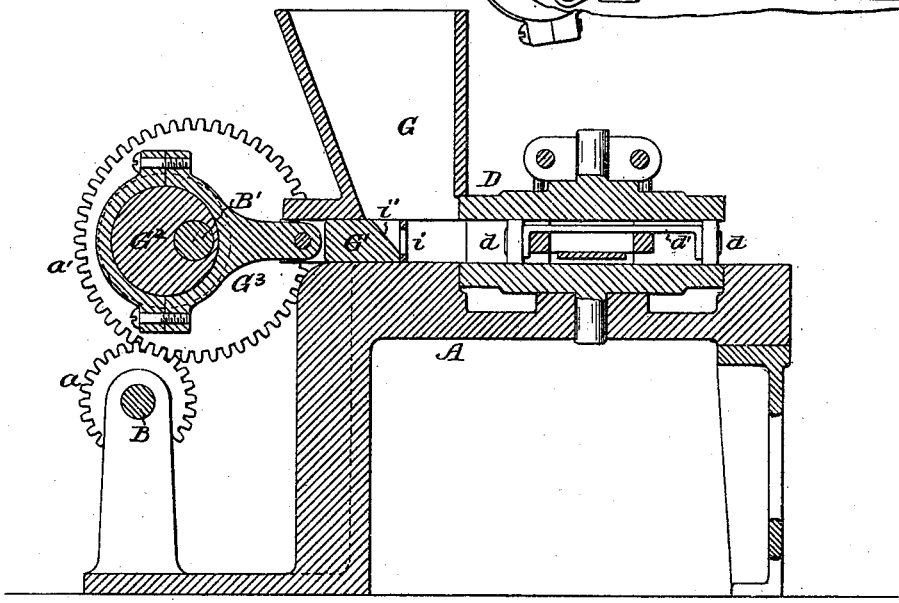
Witnesses:
H. D. Goodwin
Frank E. Bechtold
Inventor:
William Brightmore
By his Attorneys
Howson & Howson

UNITED STATES PATENT OFFICE.

WILLIAM BRIGHTMORE, OF PHILADELPHIA, PENNSYLVANIA.

BRICK-PRESS.

SPECIFICATION forming part of Letters Patent No. 539,247, dated May 14, 1895.

Application filed August 14, 1894. Serial No. 520,271. (No model.)

*To all whom it may concern:*

Be it known that I, WILLIAM BRIGHTMORE, a subject of the Queen of Great Britain, residing in the city and county of Philadelphia, State of Pennsylvania, have invented certain Improvements in Brick-Presses, of which the following is a specification.

My invention consists of a machine especially adapted for making bricks of raw clay, that is to say, clay which has simply been crushed without any subsequent mixing or tempering.

My invention comprises certain improvements in the feeding, pressing, discharging, mold-operating and mold-cleaning devices, all as fully set forth and specifically claimed hereinafter.

In the accompanying drawings, Figure 1 is a plan view of a brick-machine constructed in accordance with my invention, a cover-plate forming part of the machine being removed in order to show the construction of the parts beneath it. Fig. 2 is a view, partly in elevation and partly in section, on the line 2 2, Fig. 1. Fig. 3 is a section on the line 3 3, Fig. 1. Fig. 4 is a side view of part of the machine. Fig. 5 is an enlarged sectional plan view of one of the plungers of the machine; and Fig. 6 is a sectional plan view on the line 6 6, Fig. 2.

A represents the fixed base frame or foundation of the machine, which is provided with suitable bearings for the power receiving shaft B and main driving shaft B' of the machine, these two shafts being connected by spur gears $a$ $a'$ as shown in Fig. 3.

The machine has two horizontal mold wheels D provided with vertical shafts or spindles which are adapted to bearings formed in the table or bed A and in yokes A' which partially embrace said mold wheels; the upper ends of said yokes being connected by tension bars or rods $b$ so that the two yokes are firmly braced together and thus calculated to resist the strains to which they are subjected in the operation of the machine.

Each of the mold wheels has openings passing through it at right angles to each other, thus forming four molds in each wheel, and to each of these molds is adapted a sliding follower $d$, the followers of each pair of molds in the same line being connected by means of a bar $d'$ whereby said followers are compelled to move together in either direction.

Inward movement of either follower is restricted by means of a transverse stop bar $e$ at the rear of each mold opening, as shown in Fig. 2, these stops being of a sufficient strength to resist the thrust upon the follower when the clay is compressed in the mold by the action of the plunger.

There are two sliding plungers F, reciprocated in line with the axes of the two mold wheels, these plungers being adapted to a guide frame F' on the table or bed A and being connected by links $f$ to a sliding bar $f'$, likewise guided in the frame F' and having at the outer end an adjustable screw bolt $f^2$ with forked head which is connected to the sleeve or strap $f^3$ of a crank pin or eccentric on the shaft B' so that as said shaft is rotated sliding movement will be imparted to the bar $f'$ and the plungers F will be advanced and retracted.

By screwing up or unscrewing the bolt $f^2$ the effective length of the slide bar $f'$ may be diminished or increased so as to effect the projection of the plungers into the molds of the mold wheels to a greater or less extent, depending upon the desired degree of pressure to be imparted to the bricks.

Each plunger is heated by means of steam or other fluid entering the plunger through a pipe $g$ and escaping through a pipe $g'$, after passing through a circulating chamber $g^2$, Fig. 5, into which projects a partition $g^3$ so that as the steam passes from the pipe $g$ to the pipe $g'$ it is brought into close contact with the front portion of the plunger so as to properly heat the same. In said front portion of the plunger are vent openings $h$ leading downward to the bottom of the plunger in order to provide for the escape from the mold of clay in excess of that needed to form the brick under the desired pressure. The presence of these openings in the forward end of the plunger causes corresponding projection of the metal in said front end into the chamber $g^2$, one projection being on each side of the central partition $g^3$ so as to contract the steam space on each side of the latter and thus cause the steam to come into more intimate contact with the front end of the mold than it would in the absence of these projections.

Mounted on the table A, adjacent to each of the mold wheels is a hopper G and sliding across the bottom of this hopper in line with the axis of the mold wheel is a pusher G' having a perforated face plate $i$ in the rear of which is a beveled recess $i'$, reciprocating movement being imparted to this pusher from an eccentric $G^2$ on the shaft B', through the medium of the eccentric strap $G^3$, as shown in Fig. 3.

Projecting from the upper face of each of the mold wheels D is a series of pins $m$, one for each mold, and these pins are engaged by a hooked catch $m'$ hung to the end of a sliding bar $m^2$, Fig. 4, a spring $m^3$ serving to cause the hooked catch to engage with the pins $m$ in succession as the slide bar $m^2$ is reciprocated, so as to impart intermittent movements of partial rotation to the mold wheels. Movement is imparted to the sliding bar $m^2$ from a crank $n$ at the end of the shaft B', said crank being connected by a link $n'$ to an arm $n^2$, slotted for the reception of a set screw $n^3$ whereby it is secured to the slide bar $m^2$.

In order to provide for accurate adjustment of this arm $n^2$ on the slide bar $m^2$, said bar has projecting lugs $m^4$, Fig. 4, which receive set screws $m^5$ acting upon the opposite ends of the arm $n^2$. Hence by slackening one of said set screws and correspondingly screwing up the other the arm $n^2$ can be moved in one direction or the other and the limit of movement of the slide bar $m^2$ thus accurately determined in order that the mold wheel may stop with its molds in proper relation to the other parts of the machine.

Passing into or through each of the yokes A' is a pipe $s$ and each of these pipes has a perforated portion in line with the molds of the adjacent mold wheel, this perforated portion of the pipe being surrounded by a wrapping $s'$ of porous material preferably of a textile character, so that when oil is admitted to the pipe this porous material will become saturated and will, by contact with the faces of the followers $d$, lubricate said faces as the followers are carried in succession past the pipe.

It will be observed on reference to Fig. 2 that the porous wrappings $s'$ are less in length than the height of the mold, so that said porous wrappings can project into the mold and come into contact with the front face of the partially retracted plunger so that no portion of the latter need be projected beyond the outer end of the mold in order to come into contact with the lubricator.

The cycle of operations performed in the working of the machine is as follows: Supposing that the mold wheel has been turned so as to bring one of its molds into line with the pusher slide at the base of the hopper, and that said pusher slide has been retracted and the space in front of the same filled with clay from the hopper, on the advance of the pusher slide this mass of clay will be pushed into the mold and the follower $d$ will be pushed inward as far as the stop bar $e$ will permit, the clay then receiving its initial pressure in the mold as the pusher slide G' continues to advance. Any surplus clay will escape through the perforated face plate $i$ of the pusher slide into the beveled recess $i'$ and then upward into the hopper. Owing to the use of the independent face plate $i$, perforations of any desired size may be used so as to determine the ease of escape of the surplus clay and the consequent initial pressure exerted upon the brick. As the pusher slide moves backward the mold wheel is turned so as to bring a fresh mold into position to be filled, the filled mold being brought into line with the plunger F which then advances, enters the mold and completes the pressing of the brick therein. The plunger is then retracted and the mold wheel receives a further movement so as to bring a third mold into position for being filled, this mold being the one opposite that containing the fully pressed brick. As the clay is forced into this third mold, therefore, the follower is pushed inward therein and the opposite follower is caused to move outward so as to push the finished brick from its mold onto the receiving platform. This being done the mold wheel receives a further movement so as to bring the follower which has just ejected the brick into position to be lubricated by the textile wrapping or swab $s'$ and the cycle is completed by the next movement of the mold wheel which brings the mold first filled again into position to receive a fresh charge of clay, each mold, as it is filled, passing through the same succession of operations.

A machine of the character described has but few parts which are all of strong and simple construction and therefore little liable to get out of order, this being a matter of considerable importance in a brick machine which, as a general thing, is subjected to extremely rough handling, and is, in many cases, operated by unskilled attendants.

The machine is, moreover, considering its size, of large capacity, since the operations of filling the mold, pressing the brick, ejecting the brick and lubricating the face of the follower are all performed simultaneously. Hence the speed of the machine is only limited by the speed at which any one of these operations can be performed as the molds are successively brought into position.

Having thus described my invention, I claim and desire to secure by Letters Patent—

1. The combination of the mold wheel and means for intermittently moving the same, the feed hopper, the pusher slide in the bottom of the same, the followers adapted to the molds and connected together in pairs so that when one is pushed inward by a charge of clay, the opposite one will eject the molded brick, and centrally located bars extending transversely across the molds and serving as stops for limiting the inward movement of the followers and resisting the thrust thereupon, substantially as specified.

2. The combination of the mold wheels, the reciprocating plungers, the table or bed, the yokes projecting therefrom and partially embracing the mold wheels, spindles having their lower bearings in the table or bed and their upper bearings in the yokes, and tension rods connecting the free ends of said yokes, substantially as specified.

3. The combination of a mold wheel having radial molds opening on the periphery of the mold wheel, means for intermittently moving said mold wheel, and a lubricating pipe having a perforated section provided with a porous wrapping less in length than the height of the mold and so located that as the mold wheel is rotated, said porous wrapping will enter the mold and come into contact with the face of the partially retracted plunger therein, substantially as specified.

4. The plunger having a fluid supply and discharge pipe, an internal circulating chamber, clay discharge openings in the forward end, and corresponding projections extending rearwardly into the circulating chamber, and a partition extending forwardly into the circulating chamber and between said projections whereby the fluid is caused to pass into intimate contact with the front wall of the plunger, substantially as specified.

In testimony whereof I have signed my name to this specification in the presence of two subscribing witnesses.

WM. BRIGHTMORE.

Witnesses:
MURRAY C. BOGER,
JOSEPH H. KLEIN.